United States Patent [19]

Ikeda

[11] Patent Number: 4,703,479
[45] Date of Patent: Oct. 27, 1987

[54] MULTI-DIRECTION TIME DIVISION MULTIPLEX COMMUNICATION APPARATUS

[75] Inventor: Kiyoshi Ikeda, Tokyo, Japan

[73] Assignee: NEC Corporation, Japan

[21] Appl. No.: 796,857

[22] Filed: Nov. 12, 1985

[30] Foreign Application Priority Data

Nov. 15, 1984 [JP] Japan ................................ 59-240994

[51] Int. Cl.$^4$ ............................................... H04J 3/06
[52] U.S. Cl. .................................... 370/104; 370/100; 375/40
[58] Field of Search .................. 370/100, 104; 375/40, 375/106

[56] References Cited

U.S. PATENT DOCUMENTS

| | | | |
|---|---|---|---|
| 3,628,149 | 12/1971 | Swan | 375/40 |
| 4,063,174 | 12/1977 | Gupta et al. | 375/40 |
| 4,412,329 | 10/1983 | Yarborough, Jr. | 375/106 |
| 4,517,682 | 5/1985 | Neyer | 375/106 |

Primary Examiner—Robert L. Griffin
Assistant Examiner—Wellington Chin
Attorney, Agent, or Firm—Laff, Whitesel, Conte & Saret

[57] ABSTRACT

A multi-direction time division multiplex communication apparatus for a central station in a multi-direction time division multiplex communication system in which the central station transmits signals meant for each of satellite stations in a time division multiplex broadcast mode, while each of the satellite stations after extraction of a clock extracts the signal meant for the own station and intermittently transmits signals from the own station after adjusting the signals to such a timing that, when the signals from the own station reach the satellite station, the signals do not overlap with signals reaching the central station from the other satellite stations and appear as orderly as a single sequence of time division multiplex signals. Despite any fluctuation of an absolute delay time which may occur during communication between the central and satellite stations due to variations in the ambient conditions, the central station selects the output of a particular code regenerator circuit which is operating responsive to a decision clock whose timing matches with the fluctuation, thereby allowing the system as a whole to hold a communication without having the error rate increased.

1 Claim, 6 Drawing Figures

MULTI-DIRECTION TIME DIVISION MULTIPLEX COMMUNICATION APPARATUS

BACKGROUND OF THE INVENTION

The present invention relates to a multi-direction time division multiplex (MD-TDM) communication system and, more particularly, to a MD-TDM communication apparatus for a central station of a MD-TDM communication system which is capable of regulating error rate despite deviations of timing points which may result from changes in temperature and other ambient conditions as well as from aging after optimum burst positions from satellite stations, or substation, to a central station have been set up at the time of initial system installation.

In a prior art terrestrial fixed radio MD-TDM communication system, a central station communicates with a plurality of remote satellite stations, which are distributed in a limited angular zone, using a broad-band beam antenna. The central station, as in ordinary digital fixed radio communications, sends to individual satellite stations time division multiplex (TDM) frame synchronizing signals and communication signals which are meant for the respective satellite stations in a broadcast mode. Each satellite station, on the other hand, extracts only the communication signal which is directed to the own station out of the received sequence of signals, while intermittently transmitting signals based on the frame synchronizing signals from the central station only in those time slots which are assigned to the own station. At the central station, the intermittent signals from the respective satellite stations are received in an orderly sequence as if they were transmitted from a single satellite station. The MD-TDM communication system in this manner achieves the so-called point-multipoint communication.

Generally, a terrestrial fixed radio MD-TDM communication system is free from fluctuation of daily period of a satellite and others which are observed in a satellite-aided TDMA system. In such a system, therefore, a receive clock to be applied to a code regenerator circuit, or ONE/ZERO decision circuit, of a central station to which an output of a demodulator is coupled is implemented with a central station reference clock, which is used as a reference for transmission at the central station. While a satellite-aided TDMA system is designed to extract a clock from a preamble which precedes a received burst so as to use it for ONE/ZERO decision, the terrestrial fixed radio MD-TDM system does not involve preambles as mentioned above and, thereby, cuts down redundancy to enhance effective use of frequencies.

In an apparatus installed in a central station of a prior art fixed radio MD-TDM communication system, a single code regenerator circuit is built in for discriminating ONEs and ZEROs of output signals of a demodulator which is adapted to demodulate received signals. In addition, only a single kind of clock is applied to the code regenerator circuit as a decision clock; the clock comprises either a central station clock or a signal which is prepared by delaying the phase of the central station clock by a predetermined time. The problem with such a system is that, while signals are sequentially routed through a transmitter at the central station, a receiver at a satellite station, a circuit at the satellite station adapted to set up a burst transmission timing to the cental station, a transmitter at the satellite station and a receiver at the central station, any fluctuation in the absolute delay time directly translates into a deviation in decision timing between a demodulated signal from the code regenerator circuit and the decision clock and, thereby, increases error rate. This leads to the need for various temperature compensation circuits capable of allowing the delay time to undergo a minimum of fluctuation against temperature variations, such circuits making the apparatus intricate in construction. In addition, careful temperature tests have to be performed with the equipment in addition to various kinds of troublesome adjustments.

SUMMARY OF THE INVENTION

It is therefore an object of the present invention to provide an apparatus for a MD-TDM communication system which eliminates the need for special adjustments heretofore required for controlling fluctuation of absolute delay time, which occurs during a communication between a central station and satellite stations, and devices necessary for such adjustments and, yet, prevents error rate from being increased while accommodating a certain degree of fluctuation.

It is another object of the present invention to provide a generally improved MD-TDM communication apparatus.

A multi-direction time division multiplex communication apparatus for a central station in a multi-direction time division multiplex communication system of the present invention is of the type in which the central station transmits signals meant for each of satellite stations in a time division multiplex broadcast mode, while each of the satellite stations after extraction of a clock extracts the signal meant for the own station and intermittently transmits signals from the own station after adjusting the signals to such a timing that, when the signals from the own station reach the satellite station, the signals do not overlap with signals reaching the central station from the other satellite stations and appear as orderly as a single sequence of time division multiplex signals. The apparatus comprises a demodulator for demodulating a received signal which is transmitted from any of the satellite stations, a plurality of code regenerator circuits each for producing a digital signal by identifying a ONE and a ZERO of an output of the demodulator which is a digital signal, a plurality of temporary storages associated in one-to-one correspondence with the code regenerator circuits for temporarily storing an output of the associated code regenerator circuit, a clock phase delay unit for producing a plurality of clock signals each of which is delayed in phase to a degree different from the others relative to a clock timing of a central station clock signal, which is applied to the clock phase delay unit, the clock signals having different timings being applied as decision clock signals to the code regenerator circuits in one-to-one correspondence, a clock extractor circuit for extracting a received clock signal from the output of the demodulator, a phase comparator for comparing a phase of an output clock signal of the clock extractor circuit with a phase of the central station clock signal, a sample-hold circuit for sample-holding an output of the phase comparator burst by burst, and a selector circuit for selecting an output of one of the temporary storages which has the smallest error rate responsive to an output of the sample-hold circuit.

The above and other objects, features and advantages of the present invention will become more apparent from the following detailed description taken with the accompanying drawings.

DESCRIPTION OF THE PREFERRED EMBODIMENT

While the MD-TDM communication apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
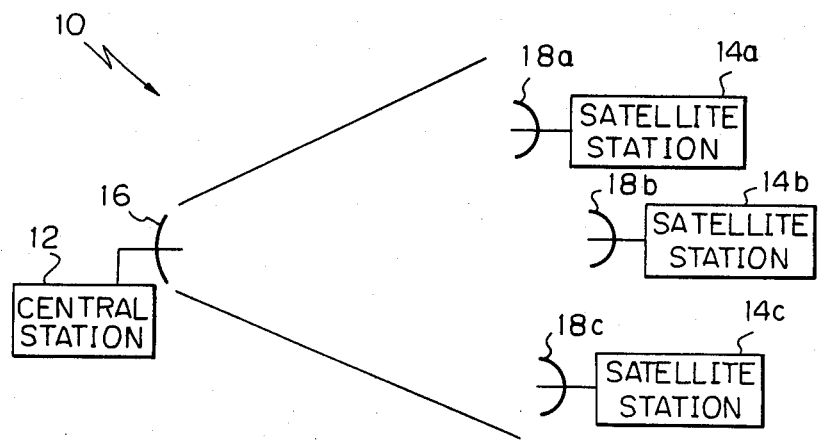
FIG. 1 is a schematic diagram showing a terrestrial fixed radio MD-TDM communication system.
Figure 2:
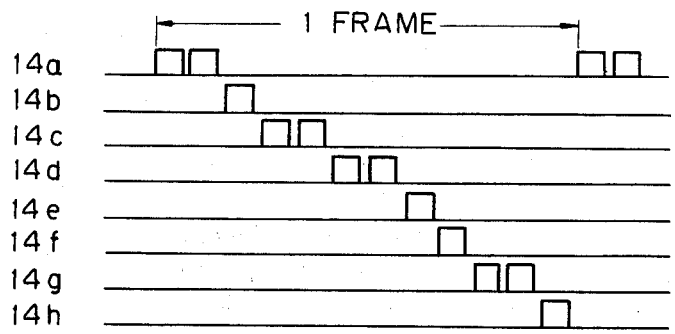
FIG. 2 shows examples of bursts which are transmitted from satellite stations in an MD-TDM communication system.
Figure 3:
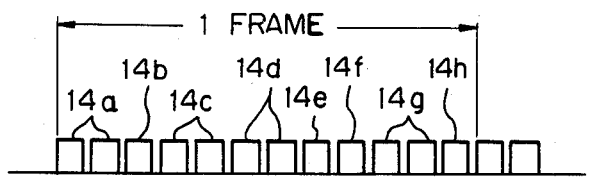
FIG. 3 shows examples of burst which a central station in a MD-TDM communication system receives.

Referring to FIG. 1 of the drawings, an ordinary terrestrial fixed radio MD-TDM communication system is shown and generally designated by the reference numeral 10. A central station 12 communicates with a plurality of satellite stations, or substations 14a, 14b, 14c ... which are distributed in a certain angular zone, using a broad-band beam antenna 16. Each of the satellite stations 14a, 14b, 14c ... is provided with a narrow-band beam antenna 18a, 18b, 18c, ..., respectively. The central station 12 sends TDM frame synchronizing signals and satellite-by-satellite communication signals to the satellite stations 14a, 14b, 14c ... in a broadcast mode. Each of satellite stations 14a, 14b, 14c, ... extracts only the signal which is directed to it out of the received signal squence and, timed to the incoming frame synchronizing signals, intermittently transmits signals only in those time slots which are assigned to it, as shown in FIG. 2. Then, a receiver at the central station 12 (see FIG. 4) receives the signals which have been intermittently transmitted from each of the satellite stations 14a, 14b, 14c ... and formatted as orderly as a sequence of signals from a single satellite station, as shown in FIG. 3.

Figure 4:
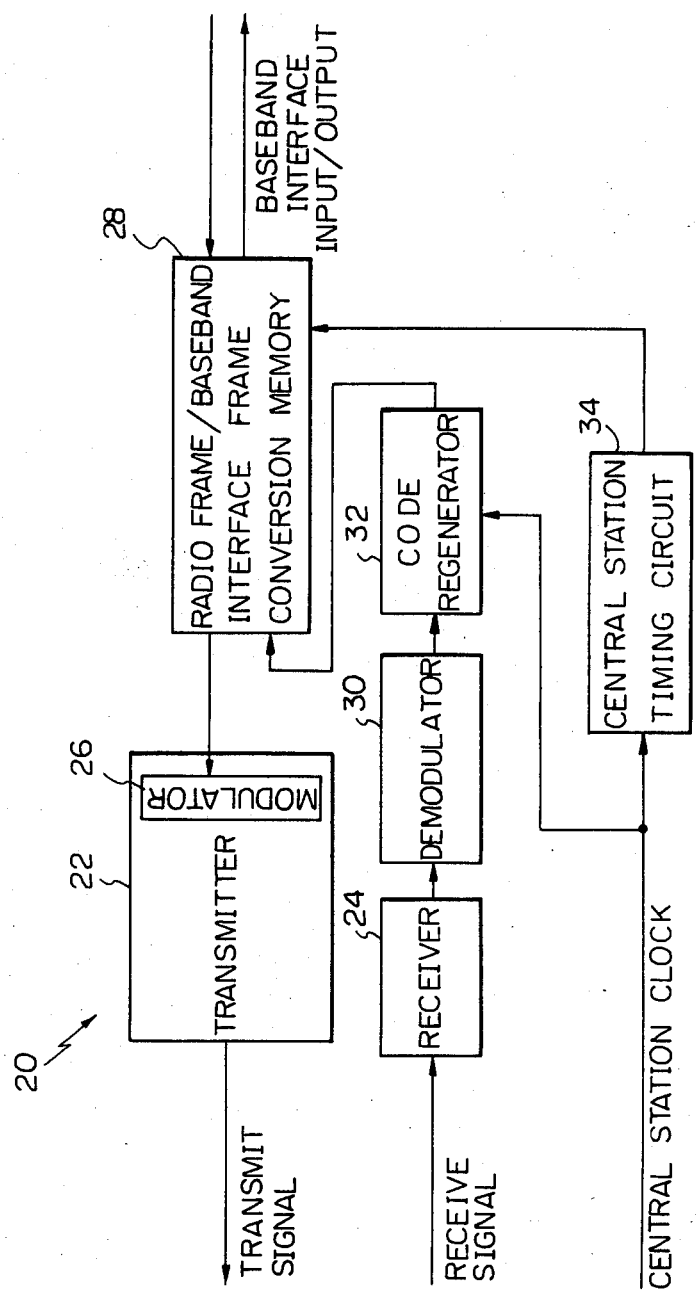
FIG. 4 is a block diagram showing the construction of a central station in a prior art MD-TDM communication system.

Referring to FIG. 4, a prior art apparatus installed in the central station 12 for the MD-TDM communication system is shown. The apparatus, generally 20, includes a transmitter 22 for generating output signals which are to be sent to the satellite stations 14a, 14b, 14c ... , and a receiver 24 for receiving signals transmitted from the satellite stations 14a, 14b, 14c, ... The transmitter 22 is provided with a modulator 26 to which an output of a radio frame/baseband interface frame conversion memory circuit 28. The memory circuit 28 in turn is supplied with a baseband signal. An output of the receiver 24 is delivered to a demodulator 30 an output of which in turn is routed to a code regenerator circuit 32 to be decided whether it is a ONE or a ZERO. A central station clock is fed to the code regenerator circuit 32 and a central station frame timing circuit 34. The output of this circuit 34 is delivered to the memory circuit 28.

As previously stated, the prior art apparatus 20 includes only a single code regenerator circuit 32 for discriminating ONEs and ZEROs of the outputs of the demodulator 30, and uses a single decision clock which is applied to the circuit 32 and implemented with a central station clock or a signal delayed a predetermined time in phase relative to the central station clock. In such a system 10, while signals make one turn through the central station transmitter, satellite station receiver, satellite station circuit for setting a burst transmission timing to the central station, and central station receiver, any fluctuation of absolute delay time directly translates into a deviation in decision timing between the demodulated output of the code regenerator circuit 32 and the decision clock. Such naturally causes error rate to increase.

The present invention has been elaborated with the above-discussed problem in view. Specifically, a characteristic feature of the present invention resides in the provision of a plurality of combinations of a code regenerator circuit for regenerating digital signals by identifying ONEs and ZEROs and a temporary storage for temporarily storing output signals of the code regenerator circuit. Another characteristic feature of the present invention is that a clock phase delay unit is provided to prepare a plurality of decision clocks from a central station clock which have different timings designed to cope with possible fluctuation of the timing of the demodulator output, each of the decision clocks being applied to a predetermined one of the plurality of code regenerator circuits. Specifically, the code regenerator circuits identify ONEs and ZEROs in parallel relation responsive to the decision clocks which have different timings within the presumable range of timing fluctuation of the demodulator output, the results of identification being stored in the temporary storages which are associated with the individual code regenerator circuits.

A farther characteristic feature of the present invention resides in the provision of a clock extractor circuit. The clock extractor circuit extracts a received clock out of an output of the demodulator, while a phase comparator compares the phase of the received clock with the central station clock to determine a deviation of the former. Then, the output of one of the code regenerator circuits which is performing ONE/ZERO discrimination at a particular timing which optimumly matches with the above-mentioned deviation, i.e., responsive to one of the decision clocks which minimizes error rate is selected. Specifically, the output of the phase comparator is applied to a sample-hold circuit to be sample-held burst by burst; if the sample-held value is known, which one of the decision clocks has the optimum timing can be known beforehand. Thus, a selector circuit to which an output of the sample-hold circuit is applied selects the output of a particular regenerator circuit which is matched to the output signal in advance. Meanwhile, since a certain period of time is necessary for a phase deviation of received clock to be determined, a regenerated signal has to be held for that period of time. This requirement is met by the temporary storages which are associated in one-to-one correspondence with the code regenerator circuits.

Figure 5:
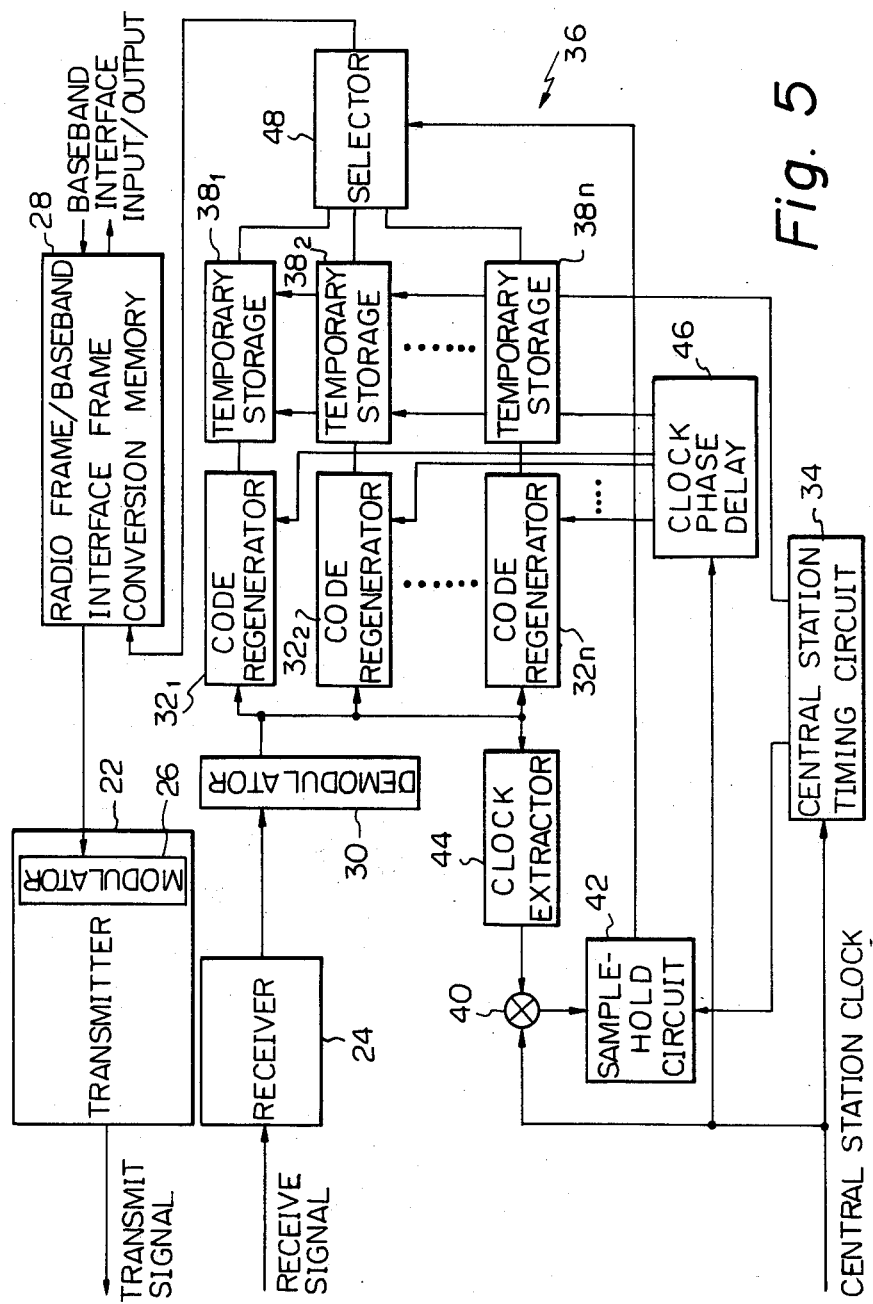
FIG. 5 is a block diagram of a MD-TDM communication apparatus embodying the present invention which is installed in a central station of a MD-TDM communication system.

Referring to FIG. 5, a MD-TDM communication apparatus 36 embodying the present invention is shown and generally designated by the reference numeral 36. In FIG. 5, the same or similar structural elements as those shown in FIG. 4 are designated by like reference numerals. As briefly stated above, the apparatus 36 includes a plurality of code regenerator circuits $32_1$, $32_2$, ..., $32_n$, and a plurality of temporary storages $38_1$, $38_2$, ..., $38_n$. The apparatus also includes a phase comparator 40, a sample-hold circuit 42, a clock extractor circuit 44, a clock phase delay unit 46, and a selector circuit 48. A baseband signal inputted into the central station is applied to a radio frame/baseband interface frame conversion memory circuit 28 to be thereby transformed into a radio frame having a satellite-by-satellite burst configuration. The output of the memory circuit 28 is fed to a modulator 26 of a transmitter 22 and, then, sent to satellite stations. Meanwhile, a received signal is routed through a receiver 24 to a demodulator 30 the output of which is represented by an eye pattern in FIG. 6. With the prior art apparatus, ONEs and ZEROs of such an eye pattern would be regenerated by the single code regenerator circuit 32. In contrast, the apparatus 36 in accordance with the present invention is furnished with a plurality of code regenerator circuits $32_1$, $32_2$, ..., $32_n$ to which clocks prepared by the clock phase delay unit 46 and delayed sequentially and little by little relative to the central station clock are assigned in one-to-one correspondence. A sequence of decided signals coming out of each of the code regenerators $32_1$, $32_2$, ... $32_n$ is stored in the temporary storage $38_1$, $38_2$, ..., $38_n$ associated with the code regenerator. Each of the temporary storages has a capacity, or number of bits, large enough to accommodate at least one burst.

The output of the demodulator 30 is also applied to the clock extractor circuit 44, which may comprise a tank circuit, in order to determine the optimum burst decision timing. The received clock separated by the clock extractor 44 is compared with the central station clock by the phase comparator 40 and, then, held by the sample-hold circuit 42. The selector circuit 48 which has a voltage to optimum timing correspondence calibrated beforehand selects one of the signal sequences stored in the temporary memories $38_1$, $38_2$, ..., $38_n$ which has been decided at a particular one of the timings which seems to be lowest in error rate. The selected signal sequence is applied to the radio frame/baseband interface frame conversion memory circuit 28. The baseband signal output from the memory circuit 28 is delivered to a device which is connected to the central station.

Figure 6:
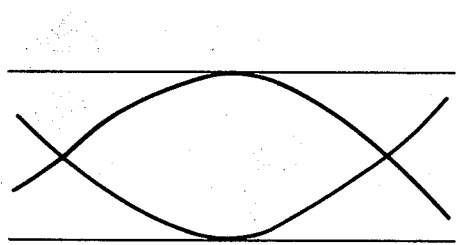
FIG. 6 shows timings of decision clock pulses which are applied to code regenerator circuits in relation to an output waveform (eye pattern) of a demodulator in accordance with the embodiment of FIG. 5.
Figure 6:
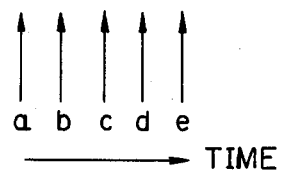

Taking the eye pattern of FIG. 6 for example, since the opening degree of the eye pattern is highest at a timing point c, a pulse at the timing point c is decided to be the ONE/ZERO decision pulse, thereby selecting the stored signal sequence. If the eye pattern of the next burst has the greatest opening degree at another timing point b, for example, the selector circuit 48 will then select a signal sequence associated with a ONE/ZERO decision pulse which occurs at the timing point b for reading the next burst.

In summary, it will be seen that the present invention provides a MD-TDM communication apparatus which, even if the absolute delay time fluctuates due to variations of ambient conditions while signals are propagated from a central station transmitter back to a central station receiver through a satellite station receiver, satellite station circuit for setting a burst transmission timing to the central station, and satellite station transmitter, allows the central station to select an output of a particular code regenerator circuit which is operating responsive to a decision clock whose timing matches with the fluctuaton. Hence, the system as a whole is able to hold a communication without any increase in error rate. The equipment of the present invention, therefore, cuts down the number of complicated temperature compensation circuits heretofore used to suppress fluctuation of delay time at the satellite stations, thereby significantly reducing time and labor otherwise consumed for the adjustment of such circuits. Since a great number of satellite stations share a single central station, the present invention saves numerous circuit elements and considerable time necessary for adjustment with regard to the overall system having a single central station.

Various modifications will become possible for those skilled in the art after receiving the teachings of the present disclosure without departing from the scope thereof.

What is claimed is:

1. A multi-direction time division multiplex communication apparatus for a central station in a multi-direction time division multiplex communication system in which the central station transmits signals meant for each of satellite stations in a time division multiplex broadcast mode, while each of the satellite stations after extraction of a clock extracts the signal meant for the own station and intermittently transmits signals from the own station after adjusting the signals to such a timing that, when the signals from the own station reach the satellite station, the signals do not overlap with signals reaching the central station from the other satellite stations and appear as orderly as a single sequence of time division multiplex signals, said apparatus comprising:

a demodulator for demodulating a received signal which is transmitted from any of the satellite stations;

a plurality of code regenerator circuits each for producing a digital signal by identifying a ONE and a ZERO of an output of said demodulator which is a digital signal;

a plurality of temporary storages associated in one-to-one correspondence with said code regenerator circuits for temporarily storing an output of the associated code regenerator circuit;

a clock phase delay unit for producing a plurality of clock signals each of which is delayed in phase to a degree different from the others relative to a clock timing of a central station clock signal, which is applied to said clock phase delay unit, said clock signals having different timings being applied as decision clock signals to the code regenerator circuits in one-to-one correspondence;

a clock extractor circuit for extracting a received clock signal from the output of the demodulator;

a phase comparator for comparing a phase of an output clock signal of said clock extractor circuit with a phase of the central station clock signal;

a sample-hold circuit for sample-holding an output of said phase comparator burst by burst; and a selector circuit for selecting an output of one of the temporary storages which has the smallest error rate responsive to an output of said sample-hold circuit.

* * * * *